(12) United States Patent
Kasuga (10) Patent No.: US 9,479,761 B2
(45) Date of Patent: Oct. 25, 2016

(54) DOCUMENT CAMERA, METHOD FOR CONTROLLING DOCUMENT CAMERA, PROGRAM, AND DISPLAY PROCESSING SYSTEM

(75) Inventor: Hirofumi Kasuga, Mastumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 1366 days.

(21) Appl. No.: 13/306,183

(22) Filed: Nov. 29, 2011

(65) Prior Publication Data

US 2012/0154543 A1 Jun. 21, 2012

(30) Foreign Application Priority Data

Dec. 15, 2010 (JP) ................. 2010-278924

(51) Int. Cl.
*H04N 13/02* (2006.01)
*G03B 17/54* (2006.01)
*G03B 35/08* (2006.01)
*H04N 13/04* (2006.01)

(52) U.S. Cl.
CPC .......... *H04N 13/0285* (2013.01); *G03B 17/54* (2013.01); *G03B 35/08* (2013.01); *H04N 13/0239* (2013.01); *H04N 13/0242* (2013.01); *H04N 13/0452* (2013.01)

(58) Field of Classification Search
CPC ...................... G06K 9/00993; H04N 1/00352; H04N 1/2036; H04N 1/00323; H04N 13/0452; H04N 13/0285; H04N 13/0239; H04N 13/0242; G03B 17/54; G03B 35/08
USPC .............................................. 348/47, 42, 51
See application file for complete search history.

(56) References Cited

U.S. PATENT DOCUMENTS

| 4,573,191 | A | * | 2/1986 | Kidode | ................. | G01C 11/00 348/E13.014 |
| 5,625,408 | A | * | 4/1997 | Matsugu | ............... | G06T 7/0022 348/231.6 |
| 6,005,607 | A | * | 12/1999 | Uomori | ............. | H04N 13/0278 345/32 |
| 6,204,876 | B1 | * | 3/2001 | Uomori | ................... | G06T 15/10 348/47 |
| 7,586,655 | B1 | * | 9/2009 | Uhlik et al. | ................... | 358/497 |
| 7,619,784 | B1 | * | 11/2009 | O'Sullivan et al. | ........... | 358/474 |
| 8,072,650 | B1 | * | 12/2011 | Starns et al. | ................... | 358/447 |
| 8,358,332 | B2 | * | 1/2013 | Hendrickson | ...... | H04N 13/0239 345/419 |
| 2003/0142884 | A1 | * | 7/2003 | Cariffe | ......................... | 382/285 |
| 2005/0088528 | A1 | | 4/2005 | Sambongi et al. | | |
| 2007/0230743 | A1 | * | 10/2007 | Mannerheim | ...... | G06K 9/00234 382/103 |

(Continued)

FOREIGN PATENT DOCUMENTS

| JP | A-2-193484 | 7/1990 |
| JP | A-08-009421 | 1/1996 |

(Continued)

*Primary Examiner* — Gimis Philippe
*Assistant Examiner* — Nathnael Aynalem
(74) *Attorney, Agent, or Firm* — Oliff PLC (57) ABSTRACT

An document camera used by being connected to a display apparatus is provided. The document camera includes a plurality of imagers, an image processing unit that produces two sets of image data by using two of the plurality of imagers to capture images of a single target object from different imaging positions, a parameter acquisition unit that acquires a parameter for determining an inter-image distance between the two sets of image data to be displayed by the display apparatus, and an output unit that outputs the two sets of image data and the parameter or the inter-image distance to the display apparatus.

14 Claims, 7 Drawing Sheets

(56) References Cited

U.S. PATENT DOCUMENTS

| | | | |
|---|---|---|---|
| 2008/0018731 A1* | 1/2008 | Era | H04N 13/0033 348/51 |
| 2010/0321472 A1* | 12/2010 | Kuwabara | H04N 13/0022 348/43 |
| 2011/0085789 A1* | 4/2011 | Campbell | G03B 35/00 396/325 |
| 2013/0208089 A1* | 8/2013 | Akagi et al. | 348/43 |

FOREIGN PATENT DOCUMENTS

| | | |
|---|---|---|
| JP | A-2004-56207 | 2/2004 |
| JP | A-2004-165713 | 6/2004 |
| JP | A-2004-215298 | 7/2004 |
| JP | A-2004-297540 | 10/2004 |
| JP | A-2005-143091 | 6/2005 |
| JP | A-2005-223495 | 8/2005 |
| JP | A-2005-318023 | 11/2005 |

\* cited by examiner

DOCUMENT CAMERA, METHOD FOR CONTROLLING DOCUMENT CAMERA, PROGRAM, AND DISPLAY PROCESSING SYSTEM

BACKGROUND

1. Technical Field

The present invention relates to an document camera including a plurality of imagers, a method for controlling the document camera a program, and a display processing system.

2. Related Art

An document camera of this type including two imagers has been proposed. The two imagers capture images of a single target object, and the document camera provides a user with a variety of processed images. An document camera described in JP-A-2004-215298 acquires three-dimensional information on a target object from image data captured with two imagers, produces a plurality of sets of image data based on a plurality of simulated imaging viewpoints, displays an image to be viewed from a direction that a user desires or displays a higher definition image obtained by superimposing two sets of image data.

In recent years, there are an increasing number of movie theaters and television receivers that display a three-dimensional image stereoscopically recognized by a viewer. When an document camera that can produce three-dimensional image data and display a three-dimensional image on a display apparatus is used, for example, in a class of a school or in a presentation, the document camera can provide viewers with a more realistic image. The document camera described above, however, only improves the quality of two-dimensional image data but cannot produce three-dimensional image data.

SUMMARY

An advantage of some aspects of the invention is to provide an document camera capable of displaying a three-dimensional image, a method for controlling the document camera, a program, and a display processing system.

An aspect of the invention is directed to an document camera used by being connected to a display apparatus. The document camera includes a plurality of imagers, an image processing unit that produces two sets of image data by using two of the plurality of imagers to capture images of a single target object from different imaging positions, a parameter acquisition unit that acquires a parameter for determining an inter-image distance between the two sets of image data to be displayed by the display apparatus, and an output unit that outputs the two sets of image data and the parameter or the inter-image distance to the display apparatus.

Another aspect of the invention is directed to a method for controlling an document camera including a plurality of imagers and used by being connected to a display apparatus. The method includes an imaging step of capturing images of a single target object by using two of the plurality of imagers from different imaging positions, an image processing step of producing two sets of image data captured with the two imagers, a parameter acquisition step of acquiring a parameter for determining an inter-image distance between the two sets of image data to be displayed by the display apparatus, and an output step of outputting the two sets of image data and the parameter or the inter-image distance to the display apparatus.

According to the configuration described above, two sets of image data captured with two of the plurality of imagers can be displayed with an inter-image distance between the two sets of image data. When one of the two sets of image data is image data for the right eye and the other set of image data is image data for the left eye, the document camera can provide a viewer with a three-dimensional image stereoscopically recognized by the viewer. In this case, since the document camera outputs the inter-image distance or a parameter for determining the inter-image distance, the display apparatus can shift the image data for the right eye and the image data for the left eye from each other based on the parameter, whereby the three-dimensional image can be displayed.

When the document camera outputs two sets of image data and the inter-image distance to the display apparatus, the document camera desirably includes a distance calculator that uses the parameter to calculate the inter-image distance. Alternatively, when the document camera outputs two sets of image data and the parameter for determining the inter-image distance to the display apparatus, the display apparatus desirably includes a distance calculator that uses the parameter to calculate the inter-image distance.

In this case, the document camera preferably further includes a mode switcher that switches a display mode between a three-dimensional mode in which the display apparatus displays two sets of image data with the inter-image distance therebetween and a two-dimensional mode in which the display apparatus displays one or more sets of image data without the inter-image distance therebetween. When the mode switcher switches the display mode to the three-dimensional mode, it is preferable that the parameter acquisition unit acquires the parameter, and that the output unit outputs the parameter or the inter-image distance.

According to the configuration described above, since the three-dimensional mode in which a three-dimensional image is displayed and the regular two-dimensional mode in which a two-dimensional image is displayed are provided, either mode can be chosen in accordance with the application or whether a target object is three-dimensional or two-dimensional. The mode may be switched in response to user's operation or may be automatically switched, for example, after the target object is identified based on images captured by the imagers.

In this case, when the mode switcher switches the display mode to the three-dimensional mode, the output unit preferably alternately outputs the two sets of image data at a predetermined frequency.

According to the configuration described above, a viewer who wears shuttering eyeglasses driven in synchronization with the predetermined frequency at which the two sets of image data are outputted or wears polarization-based eyeglasses through which the viewer views the two sets of image data displayed by using different polarized lights can view a three-dimensional image.

In this case, the two imagers are preferably disposed horizontally with respect to an installation surface, and the parameter acquisition unit preferably acquires the following parameters: a separation distance between the two imagers, the distance between the two imagers and the installation surface, and the angles of optical axes of the two imagers with respect to the installation surface.

According to the configuration described above, the inter-image distance can be determined based on an actual layout of the imagers. An optimum inter-image distance between actually captured two sets of image data or a parameter for calculating the inter-image distance can therefore be outputted to the display apparatus.

In this case, the two imagers are preferably so disposed that the optical axes thereof intersect the installation surface at the same angle.

According to the configuration described above, a three-dimensional image can be displayed on a display surface on which an image is displayed (screen or display, for example) with the three-dimensional image recognized stereoscopically in the forward direction with respect to the display surface.

In this case, the document camera preferably further includes at least one of a separation distance changer that changes the separation distance between the two imagers, an installation distance changer that changes the distance between the two imagers and the installation surface, and an angle changer that changes the angles of the optical axes of the two imagers with respect to the installation surface.

According to the configuration described above, since the layout of the two imagers can be adjusted, a three-dimensional image formed of image data captured from desired imaging positions can be provided.

In this case, the plurality of imagers are preferably formed of three or more imagers, and the document camera preferably further includes a selector that selects the two imagers from the three or more imagers.

According to the configuration described above, among the three or more imagers, two imagers desired by a user can be selected to capture image data. Further, a plurality of pairs of image data captured with different pairs of imagers can be combined to provide a more precise three-dimensional image.

Still another aspect of the invention is directed to a program instructing a computer to execute the processing in the method for controlling an document camera described above.

According to the configuration described above, an document camera capable of providing a three-dimensional image is achieved.

A display processing system according to another aspect of the invention includes any of the document cameras described above and the display apparatus.

According to the configuration described above, a display processing system capable of providing a three-dimensional image is achieved.

BRIEF DESCRIPTION OF THE DRAWINGS

The invention will be described with reference to the accompanying drawings, wherein like numbers reference like elements.

DESCRIPTION OF EXEMPLARY EMBODIMENTS

An document camera according to an embodiment of the invention will be described below with reference to the accompanying drawings. The document camera according to the embodiment of the invention includes two cameras and outputs two sets of image data captured with the two cameras to a display apparatus, which displays the two sets of image data. The document camera according to the embodiment, which will be described below, can switch its display mode between the following two modes: a "three-dimensional mode" in which the two sets of image data are projected with a predetermined inter-image distance therebetween and a "two-dimensional mode" in which the two sets of image data are superimposed on each other, arranged side by side, or displayed one at a time by repeatedly switching one to the other.

Figure 1:
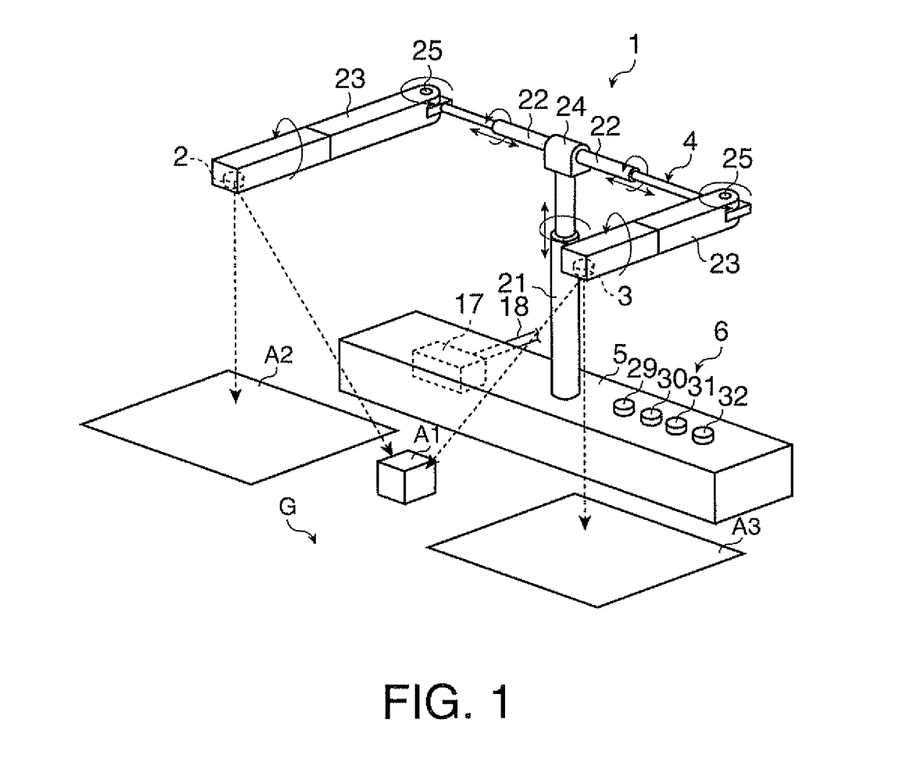
FIG. 1 is a perspective view of an document camera according to an embodiment of the invention.
Figure 2:
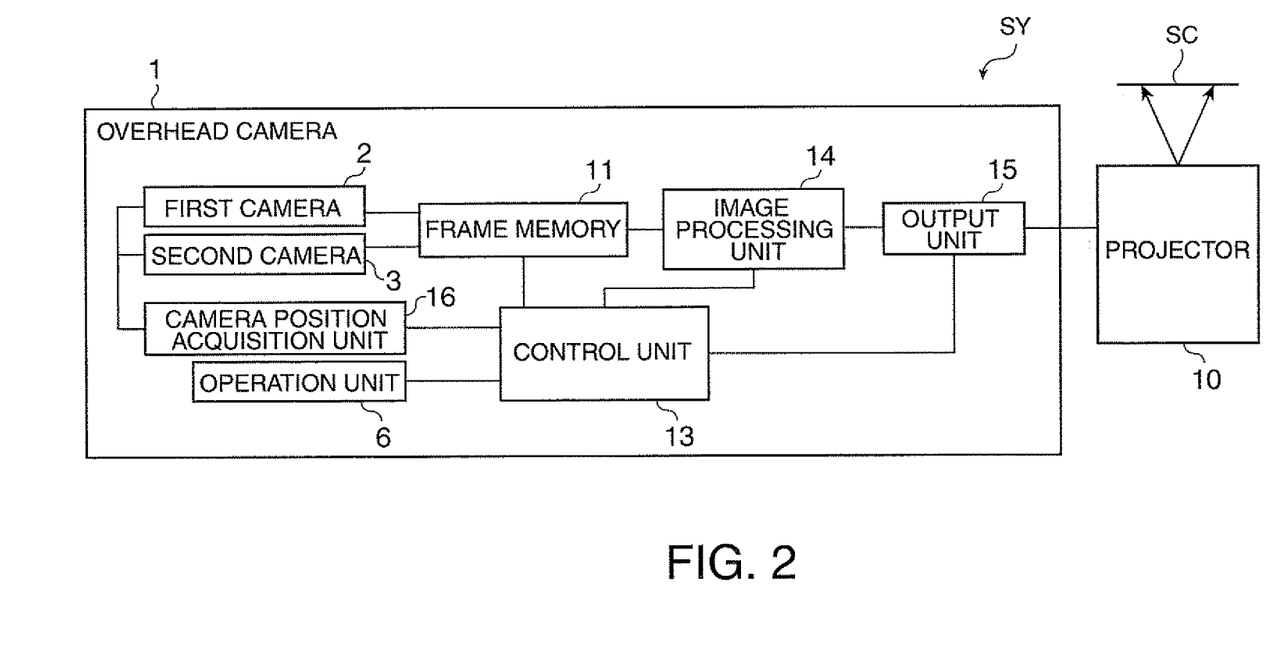
FIG. 2 is a control block diagram of the document camera and a display processing system.

FIG. 1 is an exterior perspective view of an document camera 1 according to an embodiment of the invention. The document camera 1 is connected to a projector 10, which is a display apparatus, and includes a first camera 2 and a second camera 3 (imagers), a camera stand 4 that supports the first camera 2 and the second camera 3, a support base 5 on which the camera stand 4 stands, and an operation unit 6 disposed on the support base 5, as shown in FIGS. 1 and 2. The document camera 1 further includes the following components therein: a frame memory 11, a camera position acquisition unit 16 (parameter acquisition unit), a control unit 13, an image processing unit 14, and an output unit 15.

In the document camera 1, the first camera 2 and the second camera 3 capture images of a target object A and produce two sets of image data. In the present embodiment, when the display mode, which will be described later in detail, is the "three-dimensional mode", images of a single target object A1 are captured. Further, in the "three-dimensional mode", the target object A1 is desirably a three-dimensional object. On the other hand, when the display mode is the "two-dimensional mode", the first camera 2 captures an image of a target object A2, and the second camera 3 captures an image of a target object A3. Alternatively, in the "two-dimensional mode", the first camera 2 and the second camera 3 may capture images of a single target object from different directions or may capture images of different areas of a single target object instead of the target object A2 and the target object A3.

The camera stand 4, which supports the first camera 2 and the second camera 3 in such a way that they can be arbitrarily shifted and inclined, includes a vertical support shaft 21 standing on the support base 5 and extending in the vertical direction, a pair of horizontal support shafts 22, 22 supported at a free end of the vertical support shaft 21 via a connection portion 24 and extending in the horizontal direction, and a pair of support frames 23, 23 supported via engaging portions 25, 25 pivotally in a two-dimensional plane around ends of the horizontal support shafts 22, 22 and having the cameras 2 and 3 attached to free ends of the support frames 23, 23.

Each of the vertical support shaft 21 and the pair of horizontal support shafts 22, 22 has a slide-in structure formed of a base-side, large-diameter cylindrical tube and a far end-side, small-diameter cylindrical column. The far end-side column is movable toward the far end and rotatable. The pair of support frames 23, 23 extend in the horizontal direction, and the cameras 2 and 3 are disposed in vertically lower portions at the free ends of the support frames 23, 23. Further, the free ends of the pair of support frames 23, 23 pivotally move so that the imaging directions (optical axes) of the built-in cameras 2 and 3 are changeable along the horizontal support shafts 22, 22. The extendable vertical support shaft 21 and horizontal support shafts 22, 22, the rotatable far end-side portions of the vertical support shaft 21 and horizontal support shafts 22, 22, and the pivotal support frames 23, 23 allow the following values to be changed: the distance between the cameras 2, 3 and an installation surface G, the separation distance between the cameras 2 and 3, and the imaging angles of the cameras 2 and 3 (the angles of the optical axes of the cameras 2 and 3 with respect to the installation surface G).

The vertical support shaft 21 corresponds to the "installation distance changer" in the appended claims. The support frames 23, 23 correspond to the "angle changer" in the appended claims. The horizontal support shafts 22, 22 and the support frames 23, 23 correspond to the "separation distance changer" in the appended claims.

The operation unit 6 includes a first power on/off button 29, a second power of/off button 30, a display mode switching button 31, and a display form switching button 32. The first power on/off button 29 turns on and off the first camera 2, and the second power on/off button 30 turns on and off the second camera 3. The display mode switching button 31 switches the display mode between the "two-dimensional mode" and the "three-dimensional mode". The display form switching button 32 switches a display form, which will be described later, among a variety of forms when the display mode is switched to the "two-dimensional mode".

The frame memory 11 is a storage section that temporarily stores captured image data captured with the cameras 2 and 3. Specifically, the frame memory 11 temporarily stores two sets of image data captured with one or both of the cameras 2 and 3. The frame memory 11 has a data storage area dedicated to each of the cameras 2 and 3 and separately stores captured image data in the data storage areas.

The camera position acquisition unit 16 acquires information (parameters) on the positions of the cameras 2 and 3 when the display mode is the "three-dimensional mode". Specifically, the positional information includes the distance between the cameras 2, 3 and the installation surface G, the separation distance between the cameras 2 and 3, and the angles of the optical axes of the cameras 2 and 3 with respect to the installation surface G, which are acquired based on the amount of extension of the vertical support shaft 21, the amount of extension of the horizontal support shafts 22, 22, and the amounts of pivotal motion of the support frames 23, 23 in the horizontal and vertical directions.

The control unit 13 chooses the "three-dimensional mode" or the "two-dimensional mode" based on a signal issued in response to user's operation on the display mode switching button 31 and outputs a mode setting signal representing the chosen display mode to the image processing unit 14 and the output unit 15. Further, when the display mode is switched to the "three-dimensional mode", the positional information acquired by the camera position acquisition unit 16 is used to calculate an inter-image distance W between two sets of image data to be displayed.

When the display mode is switched to the "two-dimensional mode", a mode setting signal based on a signal issued in response to user's operation on the display form switching button 32 is outputted to the image processing unit 14 and the output unit 15. The "mode switcher" set forth in the appended claims is implemented by the control unit 13 and the display mode switching button 31.

The image processing unit 14 produces output image data based on the mode setting signal from the control unit 13 and captured image data stored in the frame memory 11.

The output unit 15 outputs the produced image data to the projector 10 based on the mode setting signal from the control unit 13. In the "three-dimensional mode", the output unit 15 further outputs a calculated inter-image distance W related to two sets of image data. In the "three-dimensional mode", the output unit 15 alternately outputs two sets of image data at a predetermined frequency.

The output unit 15 includes a common terminal unit 17 (see FIG. 1) having an image output terminal, a USB terminal, or any other terminal and is connected to the projector 10 via a cable 18.

On the other hand, the projector 10 projects two sets of image data outputted from the output unit 15 on a screen SC.

Figure 3:
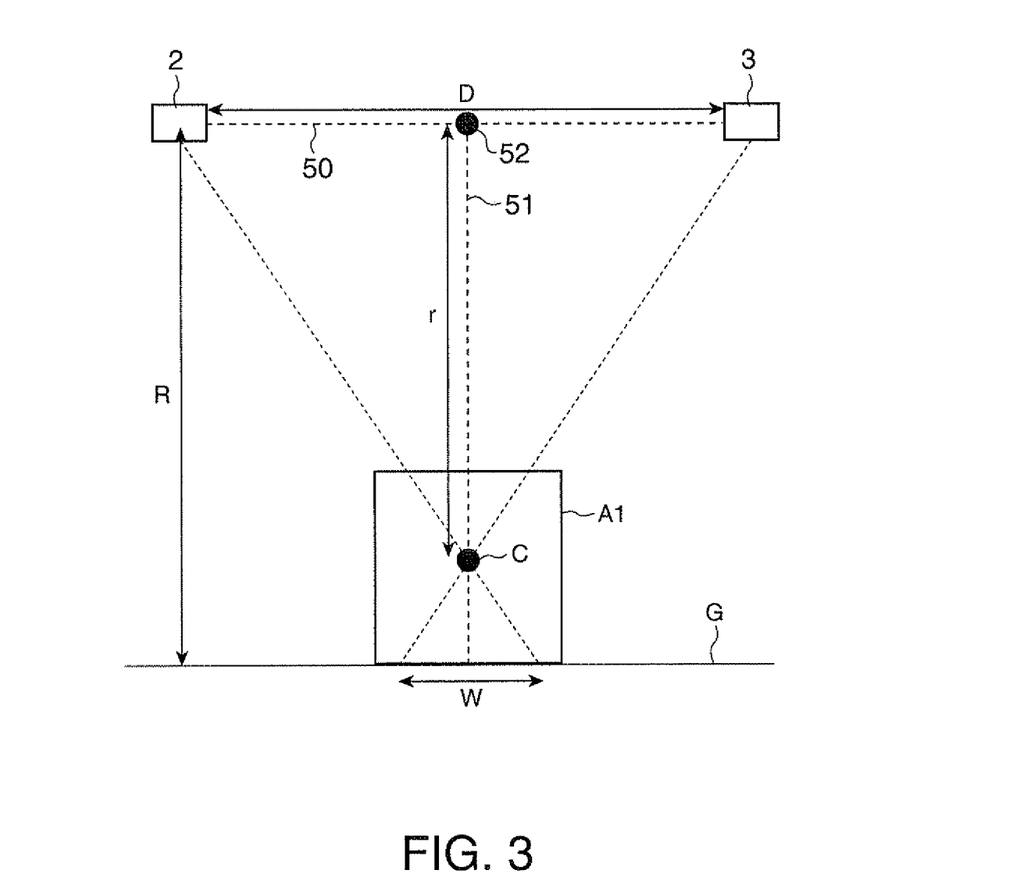
FIG. 3 shows the layout of cameras and a target object in a "three-dimensional mode".

A description will be made of the display mode in the present embodiment with reference to FIGS. 3 to 5. FIG. 3 shows the layout of the cameras 2 and 3 and the target object A1 in the "three-dimensional mode" in a front view of the camera stand 4. In the "three-dimensional mode" shown in FIG. 3, the two cameras 2 and 3 are oriented to the same target object A1 and capture images thereof. That is, the imaging angles of the cameras 2 and 3, the separation distance between the two cameras 2 and 3, and the distance to the locations where the two cameras 2 and 3 are placed (distance from the installation surface G) are so adjusted that the intersection of the optical axes of the first camera 2 and the second camera 3, what is called a congestion point C, is located substantially at the center of the target object A1. The positional information representing the positions of the cameras 2 and 3 described above is used to calculate the inter-image distance W between the two sets of image data to be displayed by the projector 10. The inter-image distance W is the amount of shift between the two sets of image data for displaying a three-dimensional image and represents how much (the number of pixels, for example) the two sets of displayed image data are shifted from each other. Specifically, the inter-image distance W can be calculated as follows: $W=(R/r-1)D$, where D represents the separation distance between the two cameras 2 and 3; R represents the distance between the two cameras 2, 3 and the installation surface G; and r represents the distance from the congestion point C to an intersection 52 of an imaginary line 50 connecting the two cameras 2 and 3 and an imaginary line 51 passing through the congestion point C and intersecting the installation surface G at right angles, as shown in FIG. 3.

In the "three-dimensional mode", the image processing unit 14 adjusts the size of each of the two sets of image data stored in the frame memory 11 in such a way that the image data is displayed across a projection area of the screen SC. The image processing unit 14 further performs standard image processing, such as data format conversion, to produce two sets of image data.

Figure 4A:
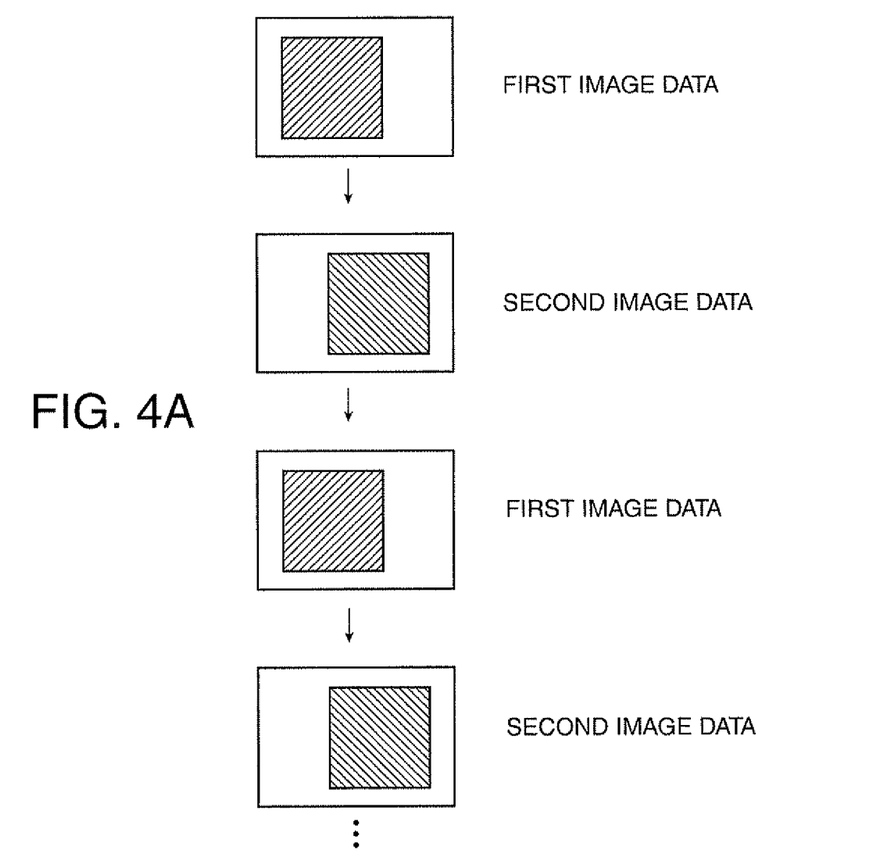
FIG. 4A shows an example of how image data are displayed in the "three-dimensional mode"
Figure 4B:
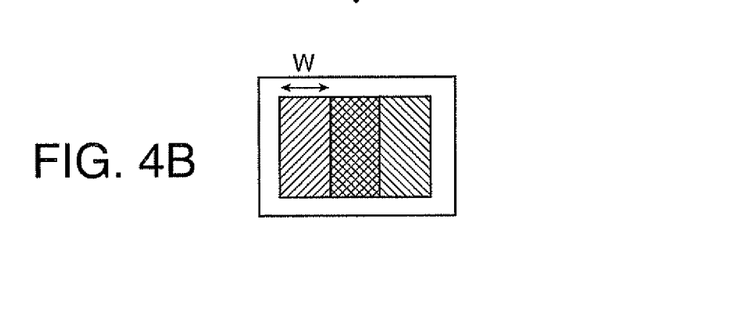
FIG. 4B shows image data viewed by a viewer with the naked eye.

FIGS. 4A and 4B show an example of how two sets of image data are displayed in the "three-dimensional mode". In FIG. 4A, image data captured with the first camera 2 is first image data, and image data captured with the second camera 3 is second image data. The two sets of image data are alternately projected at a predetermined frequency, as shown in FIG. 4A. The two sets of image data are so projected that they are shifted from each other by the calculated inter-image distance W. A viewer views with the naked eye the two sets of image data shifted from each other in the horizontal direction by the inter-image distance W, as shown in FIG. 4B. That is, the projector 10 projects the two sets of image data in such a way that one set thereof is shifted from the other set by the inter-image distance W.

Figure 5:
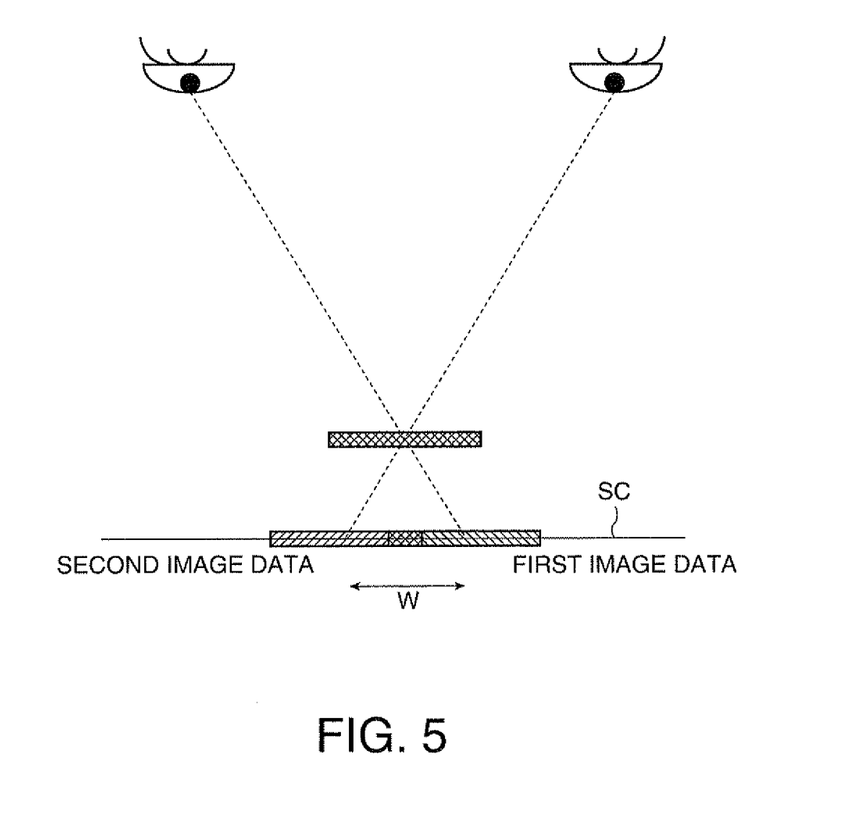
FIG. 5 is a schematic diagram showing how the viewer views a three-dimensional image in the "three-dimensional mode".

FIG. 5 is a schematic diagram showing how the viewer views a three-dimensional image in the "three-dimensional mode". The viewer wears shuttering eyeglasses including right and left shutters alternately opened and closed in synchronization with the frequency described above the eyeglasses are not shown in FIG. 5) and views the first image data with the right eye and the second image data with the left eye. When the viewer views the two sets of image data with the respective eyes as described above, the congestion point where the lines of sight intersect each other is formed in front of the screen, and a stereoscopic image is formed in the viewer's brain. In this case, the document camera or the projector desirably outputs a sync signal to the eyeglasses. The inter-image distance W is desirably set at about 65 mm, which is a typical interocular distance of a person. It, is further possible to change the degree of the stereoscopic effect by changing the positions of the two cameras to change the position of the congestion point C.

Alternatively, two sets of image data may be displayed using polarized light fluxes having different polarization directions, and the viewer may wear eyeglasses including polarizing films respectively corresponding to the two sets of image data for the left and right eyes. When the polarization-based eyeglasses are used, two sets of image data maybe displayed in a temporally separate manner by alternately outputting the two sets of image data as described above or may be displayed in a spatially separate manner by placing the two sets of image data, for example, in stripes on the screen SC. In the latter case, the image processing unit 14 combines two sets of captured image data into a single set of striped image data to be outputted.

Figure 6A:
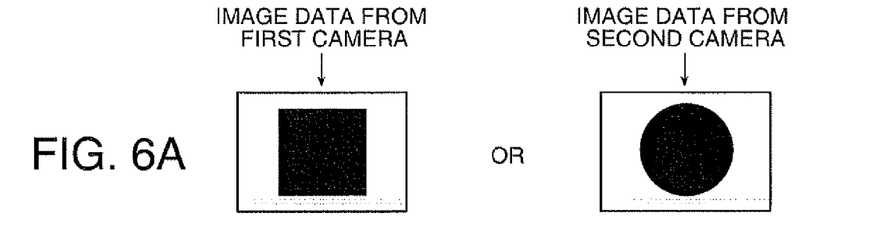
FIGS. 6A to 6E show examples of how image data are displayed in a "two-dimensional mode", FIG. 6A showing a display example in a "normal form", FIG. 6B showing a display example in a "comparison form", FIG. 6C showing a display example in a "simultaneous display form", FIG. 6D showing a display example in an "individual switching form", and FIG. 6E showing a display example in a "composite switching form".

FIGS. 6A to 6E show examples of how two sets of image data are displayed in the "two-dimensional mode". The "two-dimensional mode" is further classified into the following display forms: a "normal form", a "comparison form", a "simultaneous display form", an "individual switching form", and a "composite switching form". In the "normal form", only one set of image data stored in the frame memory 11 is displayed, as shown in FIG. 6A. In the "normal form", the image processing unit 14 adjusts the size of one set of image data in such a way that it is displayed across a display area of the screen SC and performs standard image processing, such as data format conversion, to produce one set of image data. In FIG. 6A, image data on a square figure (image data from the first camera 2) or image data on a circular figure (image data from the second camera 3) is displayed. Further, when only one camera is in operation, the control unit 13 always switches the display form to the "normal form". That is, when only one camera is in operation, the "three-dimensional mode" and the "comparison form", the "simultaneous display form", the "individual switching form", and the "composite switching form" in the "two-dimensional mode" are disabled.

Figure 6B:
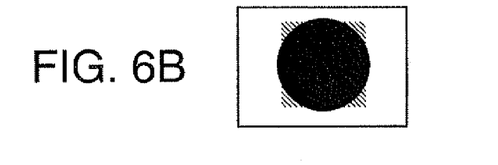

In the "comparison form", two sets of image data stored in the frame memory 11 are superimposed and displayed, as shown in FIG. 6B. In the "comparison form", the image processing unit 14 processes one of the two sets of image data into a transparent image and combines the two sets of image data in such a way that the image data having undergone the transparency process is overlaid (superimposed) on the other image data, which has not undergone the transparency process. The resultant image data then undergoes the size adjustment and the standard image processing described above. One set of image data is thus produced. In the display example shown in FIG. 6B, the image data on the square figure (image data from the first camera 2) undergoes the transparency process and is then overlaid on the image data on the circular figure (image data from the second camera 3).

Figure 6C:
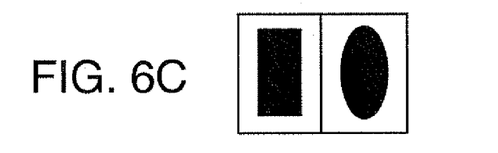

In the "simultaneous display form", two sets of image data stored in the frame memory 11 are displayed side by side, as shown in FIG. 6C. In the "simultaneous display form", the image processing unit 14 reduces the size of the two sets of image data and combines them in such a way that they are displayed side by side. The resultant image data then undergoes the standard image processing described above. One set of image data is thus produced. In the display example shown in FIG. 6C, the image data on the square figure (image data from the first camera 2) and the image data on the circular figure (image data from the second camera 3) are reduced in size in the horizontal direction and displayed side by side.

Figure 6D:
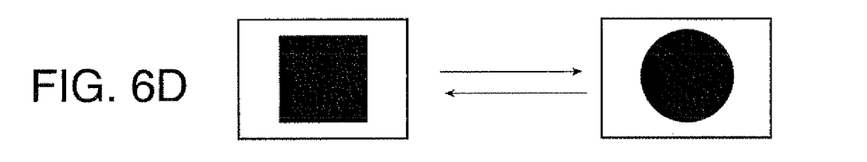

In the "individual switching form", two sets of image data stored in the frame memory 11 are switched from one to the other and one of the two sets of image data is displayed at a time, as shown in FIG. 6D. In the "individual switching form", the image processing unit 14 performs the same image processing as that in the "normal form" on each set of image data to produce two sets of image data. In FIG. 6D, the image data on the square figure (image data from the first camera 2) and the image data on the circular figure (image data from the second camera 3) are switched from one to the other and one of the two sets of image data is displayed at a time.

Figure 6E:
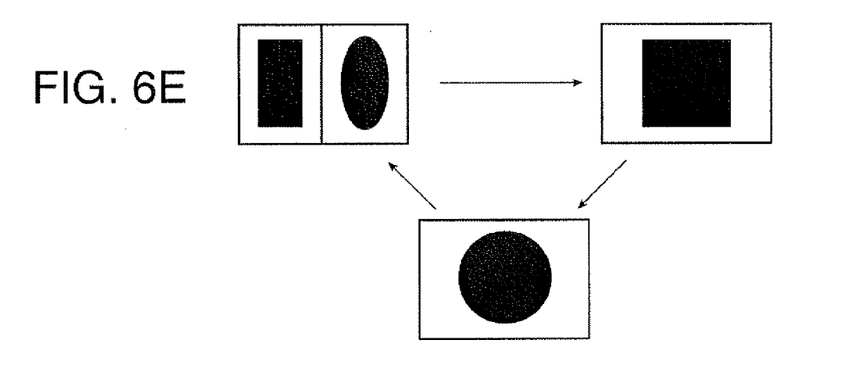

In the "composite switching form", two sets of image data stored in the frame memory 11 and image data obtained by combining the two sets of image data are switched and one of the sets of image data is displayed at a time, as shown in FIG. 6E. In the "composite switching form", the image processing unit 14 reduces the size of the two sets of image data and combines the two sets of image data in such a way that they are displayed side by side to produce one set of image data (first image data). The image processing unit 14 further performs the same image processing as that in the "normal form" on each of the two sets of image data to produce two sets of image data (second image data). As a result, the combined image data and the image data from the two cameras, three sets of image data in total, one of which is selected and displayed at a time, are produced. In FIG. 6E, the image data on the square figure (image data from the first camera 2), the image data on the circular figure (image data from the second camera 3), and image data produced by reducing them in size and placing them side by side are switched and one of the sets of image data is displayed at a time.

The separation distance between the two imagers, the distance between the two imagers and the installation surface, and the angles of the optical axes of the two imagers with respect to the installation surface may also be used as data for two-dimensionally displaying two sets of image data separately.

Figure 7:
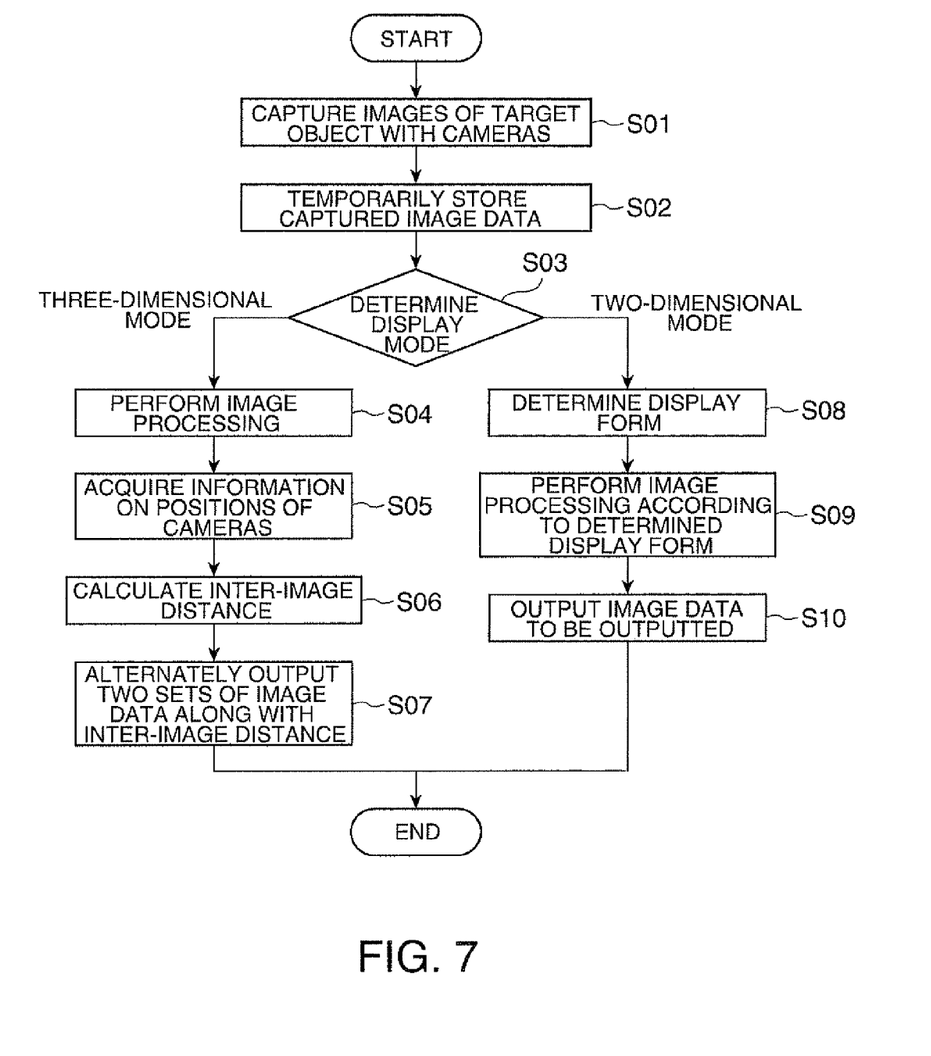
FIG. 7 is a flowchart showing how the document camera outputs image data.

A description will next be made of how the document camera 1 outputs image data with reference to the flowchart in FIG. 7. The image data output procedure will be described by assuming that both the first camera 2 and the second camera 3 are in operation and capture images. The document camera 1 (control unit 13) first instructs the first camera 2 and the second camera 3 to capture images of the target object A (target object A1 or target objects A2 and A3) (S01: imaging step), as shown in FIG. 7. The frame memory 11 then temporarily stores two sets of captured image data (S02). The display mode is then determined based on a signal issued in response to user's operation on the display mode switching button 31 (S03).

When the display mode is determined to be the "three-dimensional mode" (S03: three-dimensional mode), the image processing described above is performed on the temporarily stored two sets of captured image data so that two sets of image data are produced (S04: image processing step). The camera position acquisition unit 16 then acquires positional information (S05: parameter acquisition step), and the acquired positional information is used to calculate the inter-image distance W between the two sets of image data to be displayed by the projector 10 (S06). The thus produced two sets of image data are alternately outputted at a predetermined frequency, and the calculated inter-image distance W corresponding to the two sets of image data is also outputted to the projector 10 (S07: output step). The projector 10 desirably displays the two sets of image data in consideration of the inter-image distance W and the distance between the projector 10 and the screen SC.

On the other hand, when the display mode is determined to be the "two-dimensional mode" (S03: two-dimensional mode), one of the display forms is selected based on a signal issued in response to user's operation on the display form switching button 32 (S08). The image processing unit 14 performs the predetermined image processing described above according to the selected display form on the temporarily stored two sets of captured image data to produce image data (S09). As described above, when the "comparison form" or the "simultaneous display form" is selected, one set of image data is produced. When the "individual switching form" is selected, two sets of image data are produced. When the "composite switching form" is selected, three sets of image data are produced. When the image processing unit 14 has produced one set of image data (in "comparison form" or "simultaneous display form"), the output unit 15 outputs the one set of image data, whereas when the image processing unit has produced a plurality of sets of image data (in "individual switching form" or "composite switching display form"), image data to be outputted is selected when a display switching signal issued in response to user's operation on a button (not shown) is acquired and outputted to the projector 10 (S10). When only one of the cameras is in operation, the document camera 1 always performs the processes for the "normal form" in the "two-dimensional mode".

When the display mode is determined to be the "three-dimensional mode" (S03: three-dimensional mode), information on the positions of the two cameras 2 and 3 is acquired, as described above. In this case, it is judged whether or not the positions of the two cameras 2 and 3 (imaging angles of the cameras 2 and 3, separation distance between the two cameras 2 and 3, and distance to location where the two cameras 2 and 3 are disposed (from the installation surface G)) have appropriate values. When the judgment result shows that the positions do not have appropriate values, a message image notifying that the camera positions should be corrected may be outputted.

As described above, the document camera 1 according to the present embodiment can provide a viewer with a three-dimensional image stereoscopically recognized by the viewer in the "three-dimensional mode" described above by outputting two sets of image data captured with the two cameras 2 and 3 and having parallax therebetween to the projector 10 and instructing the projector 10 to display the image data. Further, in the present embodiment, the inter-image distance W between the two sets of image data is outputted to the projector 10 and the two sets of image data are alternately outputted. As a result, even when the projector 10 does not have a function of displaying a three-dimensional image, the projector 10 can provide the viewer with a three-dimensional image.

In the "three-dimensional mode", the positional information (distance between the cameras 2, 3 and installation surface G, separation distance between the cameras 2 and 3, and angles of optical axes of the cameras 2 and 3 with respect to the installation surface G: parameters) acquired by the camera position acquisition unit 16 may be outputted to the projector 10 along with the corresponding two sets of image data. In this case, the projector 10, which receives the positional information, desirably includes a distance calculator that calculates the inter-image distance W based on the positional information.

Further, the document camera 1, which can choose the "two-dimensional mode" or the "three-dimensional mode", can choose either mode as appropriate in accordance with the application for which the document camera 1 is used or depending on whether the target object A is two-dimensional or three-dimensional. For example, when a sentence, a plan view, or any other two-dimensional object is displayed in a class in a school, the "two-dimensional mode" is chosen, whereas when a three-dimensional model or any other three-dimensional object is displayed, the "three-dimensional mode" is chosen. In this way, the document camera 1 can provide viewers with a more realistic image, and the class can be conducted more effectively.

The document camera 1 according to the present embodiment, which includes the two cameras 2 and 3 and displays two sets of image data at the maximum, may include three or more cameras. In this case, the document camera 1 desirably includes a selector that selects two of the three or more cameras and uses the selected two cameras to capture images of the single target object A1 simultaneously in the "three-dimensional mode". In this case, the selector may be so configured that a user can select cameras whenever the user operates a button or that two specific cameras are dedicated in advance for the "three-dimensional mode". Further, a plurality of pairs of cameras may be selected from the three or more cameras, and the plurality of pairs of cameras may sequentially capture a plurality of pairs of image data, which then undergo a combination process. In this case, when the plurality of pairs of cameras capture images of the single target object A1 from different directions, the document camera 1 can provide a viewer with a more precise three-dimensional image.

In the present embodiment, the document camera 1 is wired to the projector 10 with the cable 18 and outputs image data therethrough. Alternatively, the document camera 1 may be wirelessly connected to the projector 10 and output image data wirelessly. In this case, the document camera 1 includes a built-in battery. Still alternatively, the document camera 1 may be connected to the projector 10 via a PC (personal computer). Further, the display apparatus is not limited to the projector 10, and any other display apparatus that can display two sets of image data captured with the document camera 1 can be used.

Although not described in the present embodiment, image data may be still picture data or moving picture data. Further, in the present embodiment, in which the output unit 13 outputs produced image data as they are produced, produced image data may also be recorded in a recording medium (USB memory or SD card memory). In this case, since image data can be recorded, the image data can be used at other timings as well as transferred and saved. Further, when image data are recorded, they may be recorded as still picture data, or a plurality of sets of continuous image data may be stored as moving picture data.

Two sets of image data are not necessarily outputted alternately as described above. For example, image data for the right eye and image data for the left eye may be outputted through separate paths. In this case, the display apparatus receives the two sets of image data and desirably displays them simultaneously (in a temporally or spatially separate manner).

The document camera 1 does not necessarily include the camera stand 4 described above but may alternatively include an arm-shaped support shaft that supports the cameras 2 and 3. In this case, an angle sensor or any other suitable device that detects the angle of the support shaft is desirably used to acquire information on the positions of the two cameras 2 and 3.

In the present embodiment, in which selectable display modes include the "three-dimensional mode" and the "two-dimensional mode", both the modes are not necessarily required, and at least the "three-dimensional mode" may be provided.

The entire disclosure of Japanese Patent Application No. 2010-278924, filed Dec. 15, 2010 is expressly incorporated by reference herein.

What is claimed is:

1. A document camera used by being connected to a display apparatus, the document camera comprising:
   a plurality of imagers;
   an image processing unit that produces two sets of image data by using two of the plurality of imagers to capture images of a single target object from different imaging positions;
   a parameter acquisition unit that acquires a parameter for determining an inter-image distance between the two sets of image data to be displayed by the display apparatus;
   an output unit that outputs the two sets of image data and the parameter or the inter-image distance to the display apparatus; and
   a mode switcher that switches a display mode between a three-dimensional mode in which the display apparatus displays two sets of image data with the inter-image distance therebetween and a two-dimensional mode in which the display apparatus displays one or more sets of image data without the inter-image distance therebetween,
   wherein when the mode switcher switches the display mode to the three-dimensional mode, the parameter acquisition unit acquires the parameter, and
   the output unit outputs the parameter or the inter-image distance.

2. The document camera according to claim 1,
   wherein when the mode switcher switches the display mode to the three-dimensional mode, the output unit alternately outputs the two sets of image data at a predetermined frequency.

3. The document camera according to claim 1,
   wherein the two imagers are disposed horizontally with respect to an installation surface, and
   the parameter acquisition unit acquires the following parameters: a separation distance between the two imagers, the distance between the two imagers and the installation surface, and the angles of optical axes of the two imagers with respect to the installation surface.

4. The document camera according to claim 3,
   wherein the two imagers are so disposed that the optical axes thereof intersect the installation surface at the same angle.

5. The document camera according to claim 3, further comprising:
   at least one of a separation distance changer that changes the separation distance between the two imagers, an installation distance changer that changes the distance between the two imagers and the installation surface, and an angle changer that changes the angles of the optical axes of the two imagers with respect to the installation surface.

6. The document camera according to claim 1,
   wherein the plurality of imagers are formed of three or more imagers, and
   the document camera further comprises a selector that selects the two imagers from the three or more imagers.

7. A method for controlling a document camera including a plurality of imagers and used by being connected to a display apparatus, the method comprising:
   capturing images of a single target object by using two of the plurality of imagers from different imaging positions;
   producing two sets of image data captured with the two imagers;
   acquiring a parameter for determining an inter-image distance between the two sets of image data to be displayed by the display apparatus;
   outputting the two sets of image data and the parameter or the inter-image distance to the display apparatus;
   switching a display mode between a three-dimensional mode in which the display apparatus displays two sets of image data with the inter-image distance therebetween and a two-dimensional mode in which the display apparatus displays one or more sets of image data without the inter-image distance therebetween,
   wherein when the display mode is switched to the three-dimensional mode, the parameter is acquired, and the parameter or the inter-image distance is output.

8. A non-transitory computer-readable medium having a program encoded thereon that instructs a computer to execute the processing in the method for controlling a document camera according to claim 7.

9. A display processing system comprising:
   the document camera according to claim 1; and
   the display apparatus.

10. A display processing system comprising:
    the document camera according to claim 2; and
    the display apparatus.

11. A display processing system comprising:
    the document camera according to claim 3; and
    the display apparatus.

12. A display processing system comprising:
    the document camera according to claim 4; and
    the display apparatus.

13. A display processing system comprising:
    the document camera according to claim 5; and
    the display apparatus.

14. A display processing system comprising:
    the document camera according to claim 6; and
    the display apparatus.

* * * * *